H. D. WATERHOUSE.
SENDING MECHANISM FOR PNEUMATIC DESPATCH APPARATUS.
APPLICATION FILED DEC. 2, 1907.
974,618.
Patented Nov. 1, 1910.
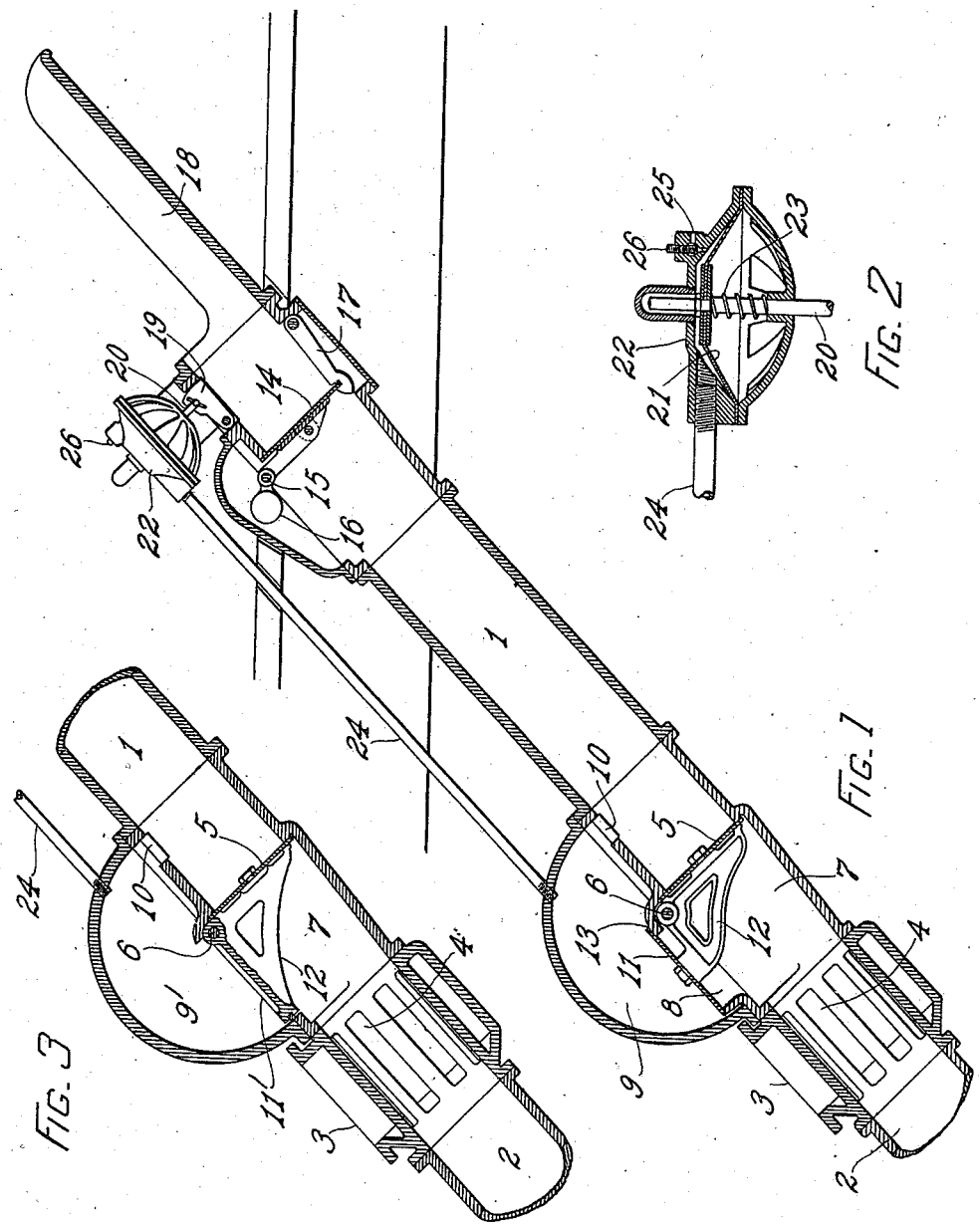

UNITED STATES PATENT OFFICE.

HAROLD D. WATERHOUSE, OF QUINCY, MASSACHUSETTS, ASSIGNOR, BY MESNE ASSIGNMENTS, TO AMERICAN PNEUMATIC SERVICE COMPANY, OF BOSTON, MASSACHUSETTS, A CORPORATION OF DELAWARE.

SENDING MECHANISM FOR PNEUMATIC-DESPATCH APPARATUS.

974,618.     Specification of Letters Patent.     Patented Nov. 1, 1910.

Application filed December 2, 1907. Serial No. 404,806.

*To all whom it may concern:*

Be it known that I, HAROLD D. WATERHOUSE, citizen of the United States, residing at Norfolk Downs, Quincy, in the county of Norfolk and State of Massachusetts, have invented certain new and useful Improvements in Sending Mechanism for Pneumatic-Despatch Apparatus; and I do hereby declare the following to be a full, clear, and exact description of the invention, such as will enable others skilled in the art to which it appertains to make and use the same.

The invention relates to sending apparatus for pneumatic despatch systems, and more especially to sending apparatus adapted to be used for sending comparatively large and heavy carriers such as are commonly employed for transmitting mail and other heavy matter.

The object of the invention is to provide an improved construction of sending mechanism which will enable the carriers to be despatched in rapid succession and at proper intervals without undue loss of air from the transmission tube, and without requiring any attention on the part of the operator other than to place the carriers successively in position to be delivered to the transmission tube.

The apparatus embodying the various features of the invention comprises a sending chamber through which the carriers are introduced into the transmission tube, and inner and outer gates for closing the sending chamber which are so controlled and operated that the outer gate is automatically closed behind the carrier immediately after the carrier enters the chamber, while the inner gate is automatically opened after the carrier has entered the sending chamber to allow the carrier to pass from the sending chamber into the transmission tube, and then automatically closes to cut off communication between the sending chamber and the transmission tube preparatory to the sending of a second carrier.

One of the principal features of the invention consists in providing means for counterbalancing the pressures on opposite sides of the inner gate, so that said gate may open under the action of the carrier as it slides through the sending chamber. By reason of the counterbalancing of the pressures on opposite sides of the inner gate, carriers may be inserted and transmitted without regard to the presence or absence of pressure within the sending chamber, and the delay incident to the equalizing of the pressure on opposite sides of this gate by the flow of air through a restricted bypass is avoided. The construction is also simplified, and the action of the apparatus rendered more reliable, by the elimination of devices for controlling the equalizing flow of air from the inner to the outer side of the inner gate. The presence of devices operated by the carrier for causing the equalization of the pressures in the transit tube and sending chamber, in order that the inner gate may be opened by the carrier, is also avoided. This feature of the invention may be embodied in constructions in which a pressure substantially equal to the pressure in the transmission pipe is normally maintained within the sending chamber, or in constructions in which the pressure within the sending chamber is normally atmospheric, the devices for operating and controlling the operation of the outer gate being modified to suit the conditions under which this counterbalancing feature is employed.

Further features of the invention relate more or less to the construction and arrangement of parts which it is preferred to employ in embodying the principal feature of the invention in a simple and reliable construction, and while these features are not essential to the broad scope of the invention, they are of importance in contributing to the simplicity and efficiency of the apparatus.

The various features of the invention will be understood from an inspection of the accompanying drawings, in which—

Figure 1 is a vertical sectional view of a transmitting mechanism embodying the features of the invention in the form in which I prefer to employ them; Fig. 2 is a detail of the timing mechanism for controlling the sending of successive carriers, and Fig. 3 is a detail showing a modified form of means for counterbalancing the pressure on opposite sides of the inner gate.

In the construction shown in Fig. 1, the sending chamber 1 is arranged in line with and forms in effect a continuation of the transmission tube 2. The transmission tube is in open communication with the supply pipe 3 through the slots 4 formed in the wall of the transmission tube. The inner or lower end of the sending chamber is normally closed by an inner gate or valve 5, which is pivoted at 6, and is normally held in closed position by the weight of the parts connected with it. The valve or gate is arranged to swing within a chamber 7 located between the lower end of the sending chamber and the communication between the supply pipe and the transmission pipe, so that the opening and closing of the gate 5 does not affect the flow of air from the supply pipe to the transmission pipe. The chamber 7 is provided with a lateral opening 8 leading to a second chamber 9 which is in constant communication with the sending chamber 1 through an opening 10. Communication between the chambers 8 and 9 is closed by means of a plate or diaphragm 11 which is secured to the supporting arm 12 which carries the gate 5. In the construction shown in Fig. 1 this plate or diaphragm 11 engages a seat 13 surrounding the opening 8 when the gate 5 is in closed position. When the gate 5 is in closed position the under side of the diaphragm 11 is subjected to the pressure within the transmission pipe, and the area of the plate is such that the pressure on the plate approximately counterbalances the pressure on the inner side of the gate 5. The upper side of the plate 11 is subjected to whatever pressure is within the sending chamber, and this pressure approximately counterbalances the pressure on the outer side of the gate 5. The pressures on opposite sides of the inner gate are therefore substantially counterbalanced so that opening and closing of the gate is substantially unaffected by the pressures on opposite sides of the gate. The gate may be weighted, therefore, in such manner that it will readily open when engaged by the carrier as it slides through the transmission chamber, and will quickly return to closed position after the carrier has passed from the sending chamber to the transmission tube. When the inner gate opens, compressed air from the transmission tube will enter the lower end of the sending chamber, so that the pressure within the sending chamber will become the same as it is within the transmission tube. In case the diaphragm 11 does not fit closely within the chamber 9, a part of the air entering the sending chamber may pass through the opening 8 and chamber 9. Such flow of air is functionless, however, as the gate 5 is at this time open, and there is free communication between the sending chamber and transmission tube.

Instead of constructing the plate or diaphragm which is subjected on opposite sides to the pressures on opposite sides of the gate 5 as shown in Fig. 1, this plate or diaphragm may be constructed as indicated in Fig. 3. As here shown, a diaphragm 11' is secured to the gate 5, and is arranged to fit closely within a segmental chamber 9', the curved wall of which is concentric with the axis about which the gate 5 swings. In this construction the diaphragm 11' closes the opening 8 between the chamber 7 and the chamber 9' when the gate 5 is closed, and this diaphragm is subjected on opposite sides to the pressures on opposite sides of the gate as in the construction shown in Fig. 1. When the gate 5 opens, the diaphragm 11' swings upward within the chamber 9, the outer edge of the diaphragm remaining in contact with the curved wall of the chamber and continuing to cut off communication between the chamber 9 and the chamber 7. This construction operates upon the same principle as that shown in Fig. 1, and may be employed with advantage, although the construction shown in Fig. 1 is preferred, since it operates with less friction, and since the parts may be more conveniently and cheaply constructed and adjusted.

Other constructions and arrangements of devices for counterbalancing the pressures on opposite sides of the inner gate may be employed in practicing the broader features of the invention.

The upper or outer end of the sending chamber is provided with an outer gate 14 which is pivoted at 15 and is normally held in position to close the upper end of the sending chamber by means of a weight 16. This gate is normally locked in closed position by means of a latch 17 arranged to engage the lower edge of the gate and to be disengaged therefrom by the carrier as it slides down against the gate.

When a carrier is to be transmitted, it is placed within an inclined receiving chute 18 which is arranged in line with the sending chamber, and when so placed, slides down over the latch 17 and against the outer gate 14. In the construction shown, the pressure within the sending chamber is normally atmospheric, and therefore the gate 14 is free to open under the weight of the carrier which slides down into the sending chamber. The gate 14 immediately closes behind the carrier, and the carrier slides down against the gate 5. Since the pressures on opposite sides of the gate 5 are substantially counterbalanced, the weight of the carrier is sufficient to open the gate and the carrier slides down into the transmission tube, the gate 5 immediately closing behind it.

In order that a sufficient interval may elapse between the entrance of successive carriers into the sending chamber to enable the first carrier to pass from the sending chamber into the transmission tube before the succeeding carrier opens the outer gate, a timing device is provided for controlling the sending of successive carriers. In the construction shown, this timing mechanism comprises a stop 19 pivotally mounted above the chute 18 some distance beyond or above the outer gate 14. This stop is connected by a rod 20 to a diaphragm 21 mounted within a diaphragm chamber 22, and is held normally out of the path of the carrier by a spring 23 acting against the under side of the diaphragm. The chamber above the diaphragm communicates through a pipe 24 with the chamber 9, which is in constant communication with the sending chamber. The diaphragm chamber also communicates with the atmosphere through a vent 25 which may be adjusted by a needle valve 26. When the inner gate 5 opens and the pressure from the transmission pipe enters the sending chamber and chamber 9, this pressure is transmitted through the pipe 24 to the upper side of the diaphragm 21, forcing the carrier stop 19 forward into the path of the carrier, so that the entrance of a second carrier into the sending chamber is prevented until the carrier stop is removed from the path of the carrier. The compressed air within the sending chamber gradually leaks out into the atmosphere through the vent 25 after the carrier has passed from the sending chamber and the gate 5 is closed. As the pressure above the diaphragm decreases, the spring 23 forces back the diaphragm, withdrawing the carrier stop. As soon as the carrier stop has been withdrawn, a second carrier may be transmitted, since the pressure within the chamber 1 has fallen to substantially atmospheric pressure, and the opening of the outer gate 14 is not prevented by the pressure within the chamber.

While it is preferred to connect the timing mechanism and the timing stop with the sending chamber, and to provide a vent from the sending chamber to the atmosphere, so that the pressure within the sending chamber will be normally atmospheric, this construction is not essential to the broader features of the invention, and may be varied without departing from the broad scope of the invention.

Having explained the nature and object of the invention, and specifically described forms of apparatus in which it may be embodied, what I claim is:—

1. In a pneumatic despatch system, a transmission tube, a sending chamber, inner and outer gates for closing the sending chamber, means for closing the outer gate after a carrier has entered the sending chamber, means for counterbalancing the pressures on opposite sides of the inner gate, and a supply pipe having a communication with the transmission tube unaffected by the opening and closing of the inner gate, substantially as described.

2. In a pneumatic despatch system, a transmission tube, a sending chamber through which the carrier slides, inner and outer gates for closing the sending chamber mounted to open under the pressure of an inserted carrier, means for closing the gates when the carrier has passed, means for counterbalancing the pressures on opposite sides of the inner valve, and a supply pipe having a communication with the transmission tube unaffected by the opening and closing of the inner gate, substantially as described.

3. In a pneumatic despatch system, a transmission tube, an inclined sending chamber through which the carriers slide, inner and outer gates mounted to open under the pressure of an inserted carrier, means for closing the gates after a carrier has passed, means for counterbalancing the pressures on opposite sides of the inner gate, and a carrier-receiving chute in line with the sending chamber, substantially as described.

4. In a pneumatic despatch system, a transmission tube, a sending chamber through which the carriers pass to the transmission tube, inner and outer gates mounted to open under the pressure of an inserted carrier, means for closing the gates after a carrier has passed, means for counterbalancing the pressures on opposite sides of the inner gate, and means for controlling the entrance of successive carriers into the sending chamber, substantially as described.

5. In a pneumatic despatch system, a transmission tube, a sending chamber through which the carriers pass to the transmission tube, inner and outer gates mounted to open under the pressure of an inserted carrier, means for closing the gates after a carrier has passed, means for counterbalancing the pressures on opposite sides of the inner gate, and means controlled by the carrier for locking the outer gate, substantially as described.

6. In a pneumatic despatch system, a transmission tube, a sending chamber through which the carriers pass to the transmission tube, inner and outer gates mounted to open under the pressure of an inserted carrier, means for closing the gates after a carrier has passed, means for counterbalancing the pressures on opposite sides of the inner gate, a stop for preventing the entrance of the carrier into the sending chamber and a timing mechanism rendered active by the passage of a carrier through the sending chamber for withdrawing said stop, substantially as described.

7. In a pneumatic despatch system, a transmission tube, a supply pipe communicating therewith, a sending chamber, a valve chamber between the sending chamber and the communication between the supply pipe and transmission tube and provided with a lateral opening, a chamber in communication with the sending chamber, a valve in the chamber normally closing the sending chamber, and a diaphragm connected with the valve and closing the opening between the valve chamber and the chamber which is in communication with the sending chamber, substantially as described.

8. In a pneumatic despatch system, a sending chamber, an outer gate therefor, means for closing the outer gate after a carrier has passed, a pivoted inner gate, and a diaphragm connected to swing with the gate and subjected on opposite sides to the respective pressures on opposite sides of the inner gate, substantially as described.

9. In a pneumatic despatch system, a sending chamber, an outer gate therefor, an inner gate, a pivoted arm carrying the inner gate, and a diaphragm carried by the arm and subjected on opposite sides to the respective pressures on opposite sides of the inner gate, substantially as described.

10. In a pneumatic despatch system, a sending chamber, an outer gate therefor, a pivoted inner gate, a counterbalancing plate connected with the inner gate and subjected on opposite sides to the respective pressures on opposite sides of the inner gate, a transmission tube, and an air supply therefor unaffected by the opening and closing of the inner gate, substantially as described.

11. In a pneumatic despatch system, a sending chamber, an inner gate therefor, a pivoted arm carrying said gate, a plate secured to said arm, a chamber below the gate in communication with the transmission tube, and provided with a lateral opening closed by the plate, and a chamber on the opposite side of said plate in communication with the sending chamber, substantially as described.

In testimony whereof I affix my signature, in presence of two witnesses.

HAROLD D. WATERHOUSE.

Witnesses:
IRA L. FISH,
ANNIE C. RICHARDSON.